United States Patent [19]

Noyes et al.

[11] 4,187,145
[45] Feb. 5, 1980

[54] HYDRAULIC LATCH SCRAM RELEASE MECHANISM

[75] Inventors: Richard C. Noyes, New Britain; Shakir U. Zaman, Windsor, both of Conn.

[73] Assignee: Combustion Engineering, Inc., Windsor, Conn.

[21] Appl. No.: 818,370

[22] Filed: Jul. 25, 1977

[51] Int. Cl.² .............................................. G21C 7/08
[52] U.S. Cl. ................................. 176/36 R; 176/86 R
[58] Field of Search ............................ 176/36 R, 86 R

[56] References Cited

U.S. PATENT DOCUMENTS

| | | | |
|---|---|---|---|
| 3,031,397 | 4/1962 | Fortescue et al. | 176/36 R |
| 3,154,472 | 10/1964 | Shannon | 176/36 R |
| 3,264,952 | 8/1966 | Winders | 176/36 R |
| 3,462,345 | 8/1969 | Jabsen | 176/36 R |
| 3,533,912 | 10/1970 | Dempsey | 176/36 R |
| 3,535,206 | 10/1970 | Germer | 176/36 R |
| 3,575,804 | 4/1971 | Ripley | 176/36 R |
| 3,933,581 | 1/1976 | McKeehan et al. | 176/36 C |
| 3,957,577 | 5/1976 | Treshou | 176/36 R |
| 4,019,954 | 4/1977 | Giordano et al. | 176/36 C |

FOREIGN PATENT DOCUMENTS 908059 10/1962 United Kingdom .................. 176/36 C

OTHER PUBLICATIONS

Memorandum by L. E. Minnick of EPRI, dated 4/29/76.
ANS Transactions, vol. 16, 10/74, pp. 275-276.

*Primary Examiner*—Samuel W. Engle
*Assistant Examiner*—S. A. Cangialosi
*Attorney, Agent, or Firm*—Lombro J. Ristas

[57] ABSTRACT

A poison bundle release mechanism within a safety assembly of a liquid metal nuclear reactor. A baffle consisting of a plate with recesses in fluid communication with low pressure coolant is formed in the upper portion of the safety assembly. A plug attached to the upper end of the poison bundle fits snugly against the recesses and is held up against the plate by the coolant pressure difference acting on the lower and upper sides of the plug. A conduit and valve arrangement is provided within the plug whereby the actuation of the valve permits high pressure coolant to enter the recessed region, reducing the pressure difference across the plug and producing rapid disengagement thereof from the plate.

6 Claims, 2 Drawing Figures

4,187,145

HYDRAULIC LATCH SCRAM RELEASE MECHANISM

BACKGROUND OF THE INVENTION

This invention relates to mechanisms for rapid insertion of a neutron absorbing poison into the core of a liquid cooled nuclear reactor. In order to increase the safety of nuclear reactors, particularly the liquid-metal cooled type, it is desirable to augment the regular plant protection system (PPS), whereby electrical signals initiate the insertion of poison rods into the reactor core, with self-actuated scram (SAS) devices that initiate a scram in direct response to potentially dangerous values of some system parameter. It is known that a SAS in response to a low coolant flow rate incident can be achieved by supporting the bundle containing the poison rods with coolant pressure differentials acting on a hydraulic latch plug such that a reduction in flow rate will cause a reduction in differential pressure across the plug, resulting in the poison bundle release and insertion into the core under the influence of gravity. Despite the straightforward safety response of this mechanisms to the loss of flow incidents, such prior art mechanisms have two shortcomings. First, these prior SAS mechanisms are responsive only to loss of flow incidents. Second, even for the loss of flow incident, the response time for the poison to enter the core is too slow to assure that no fuel will be damaged in the reactor core.

SUMMARY OF THE INVENTION

The general object of this invention is to minimize the scram time within which the reactor is safely shut down upon changes in the key system parameters originating in the reactor. It is another object of this invention to minimize the response time of hydraulic latch scram release mechanisms that depend on the differential pressure across a plug on the poison bundle for their operation. It is a more specific object to provide a fast-acting hydraulic latch release mechanism that will scram upon actuation by a device within the safety assembly that is responsive to changes in certain system parameters.

During normal operation, a hydraulic latch mechanism utilizes the coolant pressure to provide the necessary upthrust across the latch plug to keep the poison bundle suspended above the reactor core. This invention utilizes the high pressure coolant that provides the upthrust on the poison bundle latch plug under normal operation to assist the scram mode of operation in which a net downthrust on the plug is desired. A decrease in the differential pressure across the latch plug to a preset value results in the net downthrust, thereby breaking the hydraulic seal for poison bundle insertion into the core under gravity pull. Adjustment of the differential pressure required to achieve a scram is accomplished through a conduit and valve arrangement which, under normal operation maintains a recessed annulus above the plug at a low pressure as compared to higher coolant pressure under the plug. In the preferred embodiment the invention is used in conjunction with a mechanical actuator that responds to conditions such a loss of flow, high power, or low pressures, by moving a pushrod which actuates the valve. The opening of the valve permits the coolant in the high pressure conduit to flow into the low pressure conduit and then into the recessed area above the plug, thereby decreasing the pressure differential across the plug. Time required for the force difference below and above the plug to become less than the downthrust due to gravity is thus shorter than the time required in prior art devices wherein the pressure on the upper side of the plug remains constant or falls slightly while the pressure on the lower side of the plug is decreasing due to the flow coast down. Because of the expected variations of the local pressures due to the power dependence of the coolant flow rate, there is a slight power dependent variation of the time response for scram, even with this invention.

DESCRIPTION OF THE PREFERRED EMBODIMENT

Figure 1:
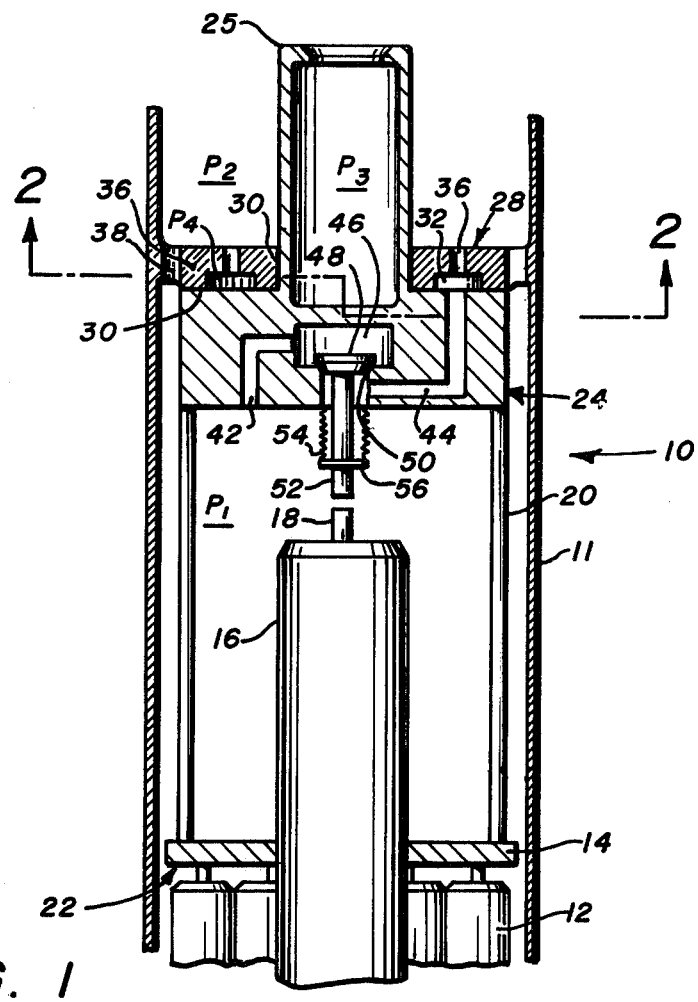
FIG. 1 shows the preferred embodiment of the invention in elevation view.

In FIG. 1 there is shown a safety assembly 10 having a safety duct 11 wherein are disposed poison rods 12 typically containing $B_4C$ neutron absorbing poison material. The poison rods 12 are connected at their tops by connector plate 14 to which are attached connecting arms 20 and a hydraulic latch plug 24. A self-actuated scram (SAS) actuator 16 extends above the poison rods 12 and in the preferred embodiment is attached to the connector plate 14. The poison rods 12, connector plate 14, SAS actuator 16 and connecting arms 20 are collectively the poison bundle 22.

The safety assembly 10 is disposed alongside fuel assemblies in a liquid metal nuclear reactor (not shown) wherein the liquid coolant, such a sodium, is pumped up through each assembly. Reactor coolant enters the bottom of the safety assembly 10 through the lower plenum region (not shown) and experiences various pressure drops before reaching pressure $P_1$ at the bottom of the latch plug 24. The minimum pressure differential across the plug 24 is set by considerations of the support pressure of the poison bundle 22, the spurious variations of pressures, and the required margin of operability at low power levels. In a typical liquid metal fast breeder reactor the poison bundle 22 weighs approximately 200 pounds and requires approximately 9 psi upthrust for support. A 12 psi pressure differential at 40 percent of full flow may be required to account for spurious variations, flow induced vibrations, mechanical shocks, and low level seismic vibrations. Thus at 100 percent flow, the pressure across the plug 24, being a quadradic function of flow, will be approximately 75 psi. These operation pressures are well within the range of known designs of liquid metal cooled reactors.

At the upper end of the safety duct 11 and connected thereto is a baffle plate 28 which limits the upward movement of latch plug 24. In this embodiment, the plate 28 has a central bore into which the gripper head 25 of the latch plug 24 is slideably received. The connection of the baffle plate 28 to the safety duct 11 contains a series of flow holes 38 which permit bypass of the higher pressure coolant into the region above the plate 28 that is at a low pressure $P_2$. The coolant at $P_2$ is in fluid communication with coolant in the upper plenum region (not shown). In this embodiment, the baffle plate 28 serves as the lower boundary of the upper plenum region. The coolant within the gripper head 25 is also in fluid communication with the upper plenum region, and is at a pressure $P_3$ approximately equal to pressure $P_2$. The lower surface of the baffle plate 28 has an annular recess 32 which is in fluid communication with the coolant at $P_2$ through passages 36.

The latch plug 24 has an upper surface adapted to mate with the lower surface of the baffle plate 28 whereby the annular recesses 32 are substantially completely enclosed. During normal operation the pressure $P_4$ in recess 32 is approximately equal to $P_2$. It is desirable that the enclosed recess 32 be capable of sustaining an increased pressure $P_4$ relative to pressure $P_2$ without excessive leakage along the mating surface between the latch plug 24 and baffle plate 28. Accordingly, flexible seal material that will not deteriorate in a liquid metal environment can be attached to baffle plate 28 as a gasket 30. Alternatively, concentric metal bellows (not shown) having an open lower end adapted to mate with the upper surface of the latch plug 24 can be attached to the plate surface inside recess 32 to effectuate a seal. The relationship of recess 32, the plate 28, and the plug 24 are shown in FIG. 2 where the combination cross-section is taken above and below the parting plane between the baffle plate 28 and the latch plug 24.

Figure 2:
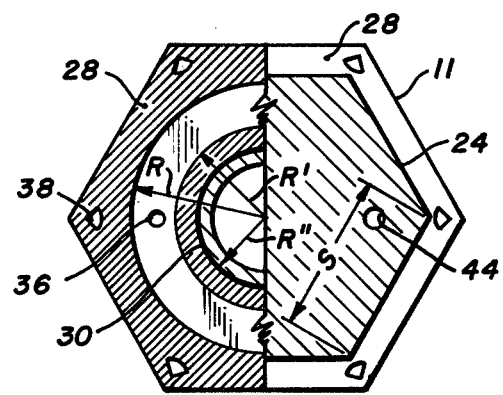
FIG. 2 shows the preferred embodiment in cross-section from below along the line 2—2 of FIG. 1.

The poison bundle 22 is held up in the normal withdrawn position against the baffle plate 28 by the net upward force approximately represented in the present embodiment by the following inequality:

$$P_1 \times (3/2)\sqrt{3S^2} > P_2 \times \pi(R^2 - R'^2) + P_3 \times \pi R''^2 + W \text{ (Equation 1)}$$

where pressures $P_1$, $P_2$, and $P_3$ are defined above and dimentions R, R', R'', and S are shown in FIG. 2. W is the force exerted by gravity on the entire poison bundle 22. The values of $P_1$, $P_2$, and $P_3$ depend on the coolant flow rate entering safety assembly 10, which is usually a controlled function of the reactor power level. As indicated above, in a typical application of the invention in a liquid metal cooled reactor, wherein the outer diameter of the safety duct 11 is about 6 inches, the pressure difference $P_1 - P_2$ is about 75 psi at 100 percent of rated flow and about 12 psi at 40 percent of rated flow. A differential pressure less than 9 psi results in the disengagement of the latch plug 24 and the dropping of the poison bundle 22. In the preferred embodiment, the desired character of the relationship of pressures $P_1$ and $P_2$ is obtained by properly sizing the flow holes 38.

The present invention pressurizes the recess 32 to a pressure $P_4$ greater than $P_2$ when a SAS scram is required so that a significant downthrust will quickly act on the top of the latch plug 24 and change the direction of inequality in Equation 1. This is accomplished in the present embodiment by a conduit and valve arrangement as follows.

The latch plug 24 contains a low pressure conduit 44 which is in fluid communication with the recess 32 when the latch plug 24 and baffle plate 28 are mated, and which is connected to a chamber 46 within the latch plug 24 through a valve seat 50. A high pressure conduit 42 is in fluid communication with the high pressure reactor coolant in the region above the poison rods 12 and leads into the chamber 46. A poppet valve 48 is located in the chamber 46 and is slightly biased in a closed position against the valve seat 50 during normal operation thereby separating the high pressure conduit 42 from the low pressure conduit 44. The valve stem 52 extends out of the latch plug 24 so that the valve 48 can be opened by an actuating pushrod 18 connected to the SAS actuator 16. A valve bellows 54 acts as a seal between the high pressure coolant at $P_1$ and the coolant in the low pressure conduit 44. The bellows end plate 56 and the effective area of the valve bellows 54 are sized in relation to the area of the poppet valve 48 to provide a nearly balanced force so that, during normal operation, the force required for opening the valve 48 will be small yet sufficient to keep the valve closed at all operating pressures.

The SAS actuator 16 is responsive to one or more system parameters such as reactor power, coolant flow rate, or rate of change of pressure, and operates to move the actuating pushrod 18 a known and predetermined distance upon the occurrence of a critical value of the system parameter. One type of self-actuating scram device responsive to reactor power and coolant flow rate is fully described in U.S. application Ser. No. 805,251 filed June 10, 1977, which is hereby incorporated by reference.

A self-actuated scram is initiated by the pushrod 18 contacting and lifting the valve stem 52 to overcome the bias on the valve 48. As the valve 48 opens, coolant within high pressure conduit 42 contacts the coolant within low pressure conduit 44, thereby increasing the pressure in conduit 44 and in recess 32 that is in fluid communication therewith. The pressure rise in recess 32 is so rapid that the coolant in recess 32 cannot flow through perforation 36 quickly enough to avoid the pressure rising in recess 32 to a value $P_4$. This causes a change in the inequality of Equation 1 so that:

$$P_1 \times (3/2)\sqrt{3S^2} < P_4 \times \pi(R^2 - R'^2) + P_3 \times \pi R''^2 + W \text{ (Equation 2)}$$

The poison bundle 22 will thus fall, inserting the poison rods 12 into the reactor core and terminating the neutron chain reaction. With the preferred embodiment of the invention, the total elapsed time between initiation of a loss of flow incident and the insertion of the poison rods 12 into the reactor core is typically less than 2 seconds. The interval includes less than 1 second for the SAS actuator 16 (described in the incorporated reference) to open the valve 48 and disengage plug 24 from the plate 28. Prior art hydraulic latch scram devices typically require up to 10 seconds between initiation of the loss of flow transient and insertion of the poison rod into the reactor core.

The poison bundle 22 can be easily reset to the withdrawn position by lowering a reset tool (not shown) into the safety duct 11, grasping the gripper head 25, and lifting the poison bundle 22 until the latch plug 24 mates with the plate 28. The reactor coolant flow is increased until the relation of $P_1$, $P_2$, and $P_3$ satisfies Equation 1 after which the reset tool is disengaged from the gripper head 25, leaving the poison bundle 22 supported only by hydraulic pressure across the latch plug 24.

It will be evident to one ordinarily skilled in this art that changes from the illustrated embodiment in the shapes and sizes of the baffle, recesses, and plug and in the orifices and conduits, can be made without departing from the scope of the invention, and that the invention may find use in connection with regular, or PPS, scram modes.

What is claimed is:

1. In a nuclear reactor scram device for rapidly inserting a control rod bundle downward into the reactor core including a safety duct having a liquid metal coolant flowing upward therethrough, baffle means attached to the duct above the reactor core, the fixed baffle means having one or more recesses on its lower side, a moveable latch plug disposed below the baffle means having an upper surface adapted to enclose the recess and a lower surface in fluid communication with coolant at high pressure, means for supplying low-pressure coolant to the recess, and means for transmitting the pressure of the high-pressure coolant to the recess when a scram is required, wherein the improvement comprises:

said latch plug being connected above and in spaced relation to the control rods of the control rod bundle; and said means for transmitting pressure are contained within said plug and actuated from below said plug, said means for transmitting pressure including a. first conduit means in fluid communication with the recess when the plug is held against the baffle means;

b. a second conduit means in fluid communication with the high-pressure coolant; and c. valve means disposed between and fluidly separating said first conduit means and said second conduit means.

2. The improvement of claim 1 further comprising means located partly within and partly below the plug for actuating said valve means.

3. The improvement of claim 2 further comprising a chamber connecting said first conduit means and said second conduit means, said chamber having a seating surface for said valve means.

4. The improvement of claim 3 wherein said actuating means includes a valve stem, and wherein said improvement further comprises sealing means disposed about said valve stem for preventing the high-pressure coolant from leaking into said chamber along said valve stem.

5. The apparatus of claim 4 wherein the portion of said valve means associated with said valve seat is a poppet valve, and wherein said sealing means is a bellows including an end plate having a predetermined surface area in contact with the high-pressure coolant, the surface area chosen in relation to the area of said poppet valve to preset the force required to actuate said poppet valve.

6. The improvement of claim 2 wherein the baffle includes an open portion through which means for resetting the plug can be operated from above the baffle.

* * * * *